(No Model.)

J. McAULIFFE.
PORTABLE WATER CLOSET.

No. 264,315. Patented Sept. 12, 1882.

WITNESSES:
Theo. G. Hoster
C. Sedgwick

INVENTOR:
J. McAuliffe
BY Munn & Co
ATTORNEYS.

UNITED STATES PATENT OFFICE.

JOHN McAULIFFE, OF PORTLAND, CONNECTICUT, ASSIGNOR TO HIMSELF AND JOHN J. BARRY, OF SAME PLACE.

PORTABLE WATER-CLOSET.

SPECIFICATION forming part of Letters Patent No. 264,315, dated September 12, 1882.

Application filed May 1, 1882. (No model.)

*To all whom it may concern:*

Be it known that I, JOHN McAULIFFE, of Portland, in the county of Middlesex and State of Connecticut, have invented a new and Improved Portable Water-Closet or Commode, of which the following is a full, clear, and exact description.

The object of my invention is to furnish a portable water-closet or commode that shall be convenient for use, cleanly, odorless, and which can be readily emptied.

To these ends the invention consists in an apparatus constructed and arranged for operation as hereinafter described and claimed.

Reference is to be had to the accompanying drawings, forming a part of this specification, in which similar letters of reference indicate corresponding parts in all the figures.

Figure 2:
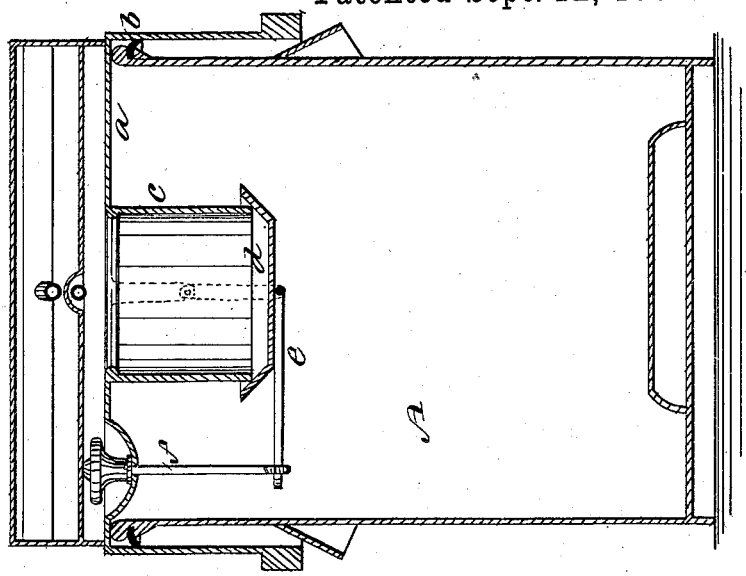
Figure 1:
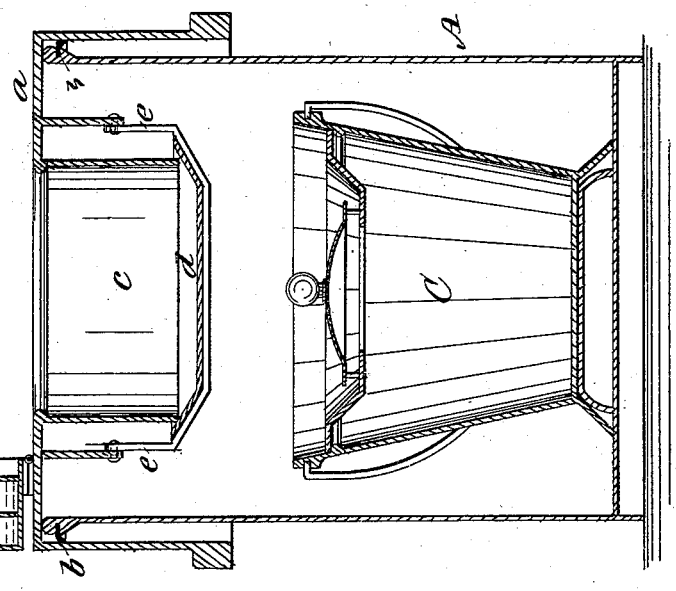
Figure 3:
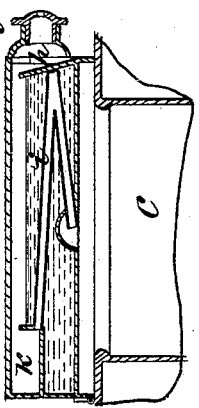

Figure 1 is a vertical section of my portable closet, with the cover raised. Fig. 2 is a vertical section at right angles to Fig. 1, and with the cover closed; and Fig. 3 is a cross-section of the cover as closed.

A is a box of suitable size, made of suitable material, and provided at its upper side with a loose cover or seat, $a$, that is flanged to set over the upper edges of the box, a suitable packing-strip being provided at $b$ to prevent escape of odors beneath the seat.

$c$ is a bowl formed by a depending flange on the under side of the seat around an opening.

$d$ is a pan suspended beneath the bowl $c$ by jointed links $e$, to which a pull, $f$, is connected, so that the pan can be swung from beneath the bowl for discharge of its contents.

B is the main cover, hinged upon seat $a$ and formed as a hollow box, so as to serve as a reservoir or holder for water. At the outer edge of cover B is a screw-cap, $g$, covering an opening that is used for filling the cover, and within the cover is a partition, $h$, which cuts off the water from the cap when the cover is closed, so that the water may not escape by the air-inlet opening in the cap. In the cover B is a tube, $i$, of V form, one end of which passes out through the bottom, while the other end is connected to a small tray or pan, $k$, which is fitted in cover B near its hinged end. The position of the tray $k$ is such that when the cover is raised the tray is filled, as shown in Fig. 1, and when the cover is closed the tray cuts off a certain quantity of water from the main reservoir, and the water in the tray will escape by pipe $i$ to the bowl and pan. This insures a supply of water to the pan at every opening and closing of the cover.

C is a pail in the box A, beneath the pan, in position for receiving the contents of the pan. This pail can be readily got at for removal by taking off the seat $a$.

Having thus described my invention, I claim as new and desire to secure by Letters Patent—

1. The hollow cover B, constructed to discharge water when closed, in combination with the box A, seat $a$, bowl $c$, and pan $d$, substantially as described.

2. In portable closets or commodes, the cover B, provided with discharge-pipe $i$, partition $h$, and tray $k$, in combination with the seat $a$ and box A, substantially as shown and described.

JOHN McAULIFFE.

Witnesses:
DENNIS A. McQUILLIN,
JAMES LAVERTY.